(12) United States Patent
Shiraishi et al.

(10) Patent No.: US 6,714,596 B1
(45) Date of Patent: Mar. 30, 2004

(54) BS DIGITAL BROADCAST RECEIVER

(75) Inventors: Kenichi Shiraishi, Yokohama (JP); Akihiro Horii, Zama (JP); Soichi Shinjo, Machida (JP); Shoji Matsuda, Machida (JP); Ryuichi Okazaki, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/582,228

(22) PCT Filed: May 13, 1999

(86) PCT No.: PCT/JP99/02468
§ 371 (c)(1),
(2), (4) Date: Jul. 21, 2000

(87) PCT Pub. No.: WO99/62237
PCT Pub. Date: Feb. 12, 1999

(30) Foreign Application Priority Data

May 22, 1998 (JP) .............................. 10/156900

(51) Int. Cl.$^7$ .......................... H04L 23/02; H04L 5/12
(52) U.S. Cl. ................... 375/265; 375/262; 375/279; 375/326; 375/341
(58) Field of Search .................. 375/265, 262, 375/316, 329, 279, 280, 341, 281, 326; 714/792, 795; 455/3.02

(56) References Cited

FOREIGN PATENT DOCUMENTS

| JP | 8-32633 | 2/1996 |
|----|---------|--------|
| JP | 8-97866 | 4/1996 |
| JP | 8-288967 | 11/1996 |
| JP | 9-321813 | 12/1997 |

OTHER PUBLICATIONS

International Search Report.

*Primary Examiner*—Jean B. Corrielus
(74) *Attorney, Agent, or Firm*—Eric J. Robinson; Robinson Intellectual Property Law Office, P.C.

(57) ABSTRACT

A BS digital broadcast receiver having no 8PSK-demapper and a less number of delay circuits for Trellis encoding. A QPSK baseband signal based upon a reception signal point position of an absolute-phased baseband demodulation signal is Viterbi-decoded by a Viterbi-decoder 6. An output of the Viterbi-decoder is convolution-reencoded by a convolution encoder 7. Upper four bits of phase error data are searched from a phase error table 31 for carrier reproduction in accordance with a phase difference between 0 degree and a phase of a phase error detection reception signal point position. The upper four bits are delayed by delay circuits 81 to 84 by a total sum of a time taken to Viterbi-decode and a time taken to convolution-encode. The delayed outputs are demapped by a demapped value conversion circuit 9. A code TCD2 determined from the demapped output and convolution encode output is output as an MSB of a Trellis 8PSK decode output from an MSB code judging/error detecting circuit 10.

4 Claims, 8 Drawing Sheets

| PHASE ERROR VOLTAGE DATA (α) | UPPER THREE BITS (β) OF (α) | AREA CORRESPONDING TO (β) | MSB JUDGING DEMAPPED VALUE | ADDITION (γ) OF 0001 TO (α) | UPPER THREE BITS (δ) OF (γ) | AREA CORRESPONDING TO (δ) | TC8PSK DEMAPPED VALUE |
|---|---|---|---|---|---|---|---|
| 111 | 011 | B | 001 | 1000 | 100 | c | 011 |
| 110 | | | | 0111 | 011 | b | 001 |
| 101 | 010 | A | 000 | 0110 | | | |
| 100 | | | | 0101 | 010 | a | 000 |
| 011 | 001 | H | 110 | 0100 | | | |
| 010 | | | | 0011 | 001 | h | 110 |
| 001 | 000 | G | 111 | 0010 | | | |
| 000 | | | | 0001 | 000 | g | 111 |
| 111 | 111 | F | 101 | 0000 | | | |
| 110 | | | | 1111 | 111 | f | 101 |
| 101 | 110 | E | 100 | 1110 | | | |
| 100 | | | | 1101 | 110 | e | 100 |
| 011 | 101 | D | 010 | 1100 | | | |
| 010 | | | | 1011 | 101 | d | 010 |
| 001 | 100 | C | 011 | 1010 | | | |
| 000 | | | | 1001 | 100 | c | 011 |
| I-AXIS IS (0) | | | | I-AXIS IS (1) | | | |

FIG. 5

| 10 (QPSK) | | | 00 (QPSK) | | |
|---|---|---|---|---|---|
| DEMAPPED VALUE | DECIDED VALUE | CHANGE | DEMAPPED VALUE | DECIDED VALUE | CHANGE |
| 000 | 110 | ○ | 000 | 000 | — |
| 001 | 010 | — | 001 | 000 | — |
| 011 | 010 | — | 011 | 100 | ○ |
| 010 | 010 | — | 010 | 100 | ○ |
| 100 | 010 | ○ | 100 | 100 | — |
| 101 | 110 | — | 101 | 100 | — |
| 111 | 110 | — | 111 | 000 | ○ |
| 110 | 110 | — | 110 | 000 | ○ |

| 01 (QPSK) | | | 11 (QPSK) | | |
|---|---|---|---|---|---|
| DEMAPPED VALUE | DECIDED VALUE | CHANGE | DEMAPPED VALUE | DECIDED VALUE | CHANGE |
| 000 | 001 | — | 000 | 011 | — |
| 001 | 001 | — | 001 | 011 | — |
| 011 | 001 | — | 011 | 011 | — |
| 010 | 101 | ○ | 010 | 011 | — |
| 100 | 101 | — | 100 | 111 | — |
| 101 | 101 | — | 101 | 111 | — |
| 111 | 101 | — | 111 | 111 | — |
| 110 | 001 | ○ | 110 | 111 | — |

BS DIGITAL BROADCAST RECEIVER

This application is a 371 of PCT/JP 99/02468 filed on May 13, 1999.

TECHNICAL FIELD

The present invention relates to a BS digital broadcast receiver, and more particularly to a BS digital broadcast receiver having a phase error table to be used for carrier reproduction.

BACKGROUND OF THE INVENTION

A BS digital broadcast system adopts as its modulation scheme Trellis coding 8PSK (simply called also Trellis 8PSK) modulation scheme which is one of coding modulation schemes.

Figure 8:
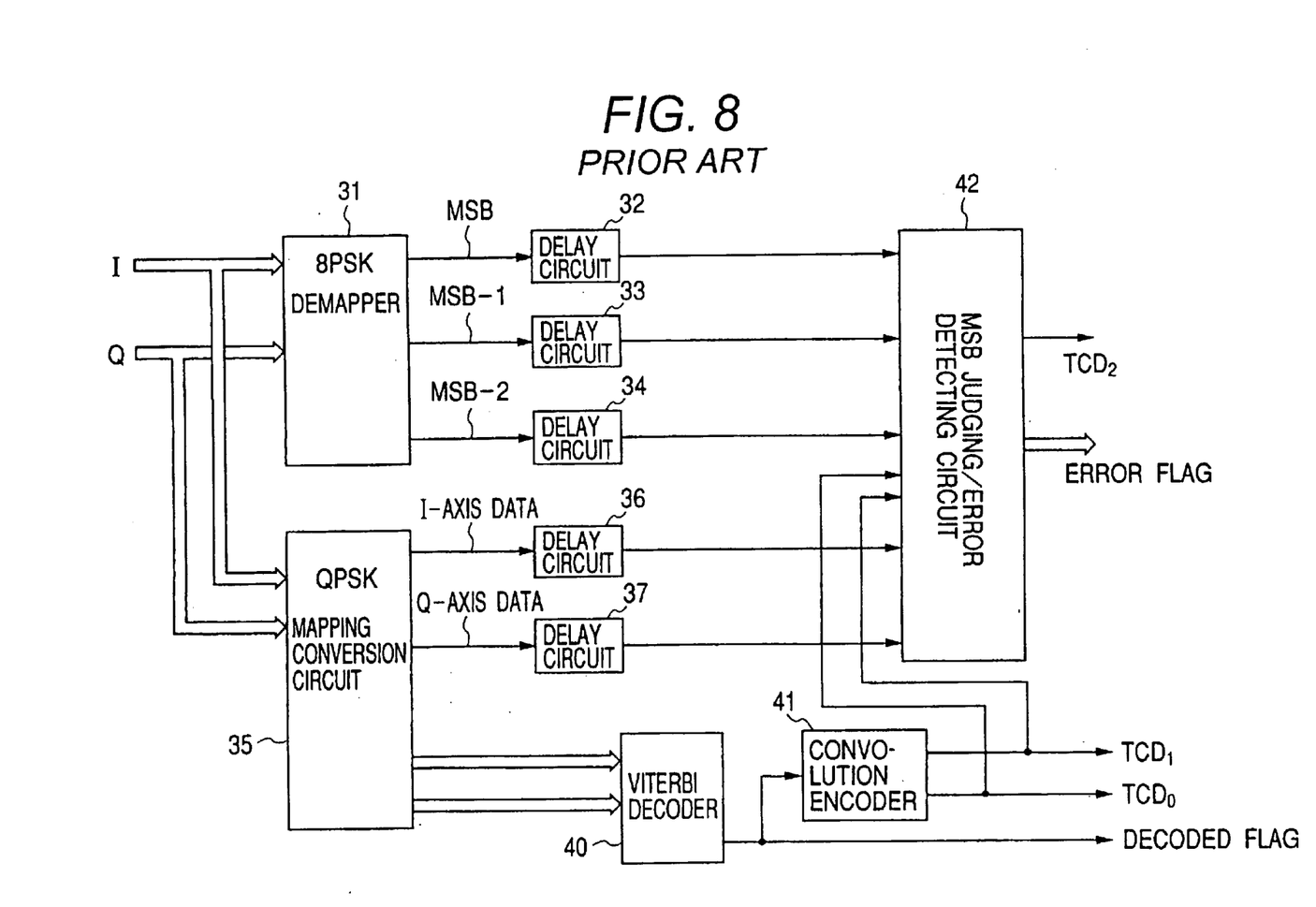
FIG. 8 is a block diagram partially showing the structure of a conventional BS digital broadcast receiver.

For Trellis decoding by a Viterbi decoder of a conventional BS digital broadcast receiver, as shown in FIG. 8, baseband demodulation signals I and Q demodulated from a reception signal converted into an intermediate frequency signal are supplied to an 8PSK demapper 31 which converts them into tri-bit data (MSB, CSB, LSB) and supplies them to delay circuits 32 to 34 to delay them. The baseband demodulation signals I and Q are also supplied to a QPSK mapping conversion circuit 35. The QPSK mapping conversion circuit 35 converts the signals I and Q into baseband demodulation signals I' and Q' of QPSK and outputs them. The QPSK mapping conversion circuit 35 also outputs I-axis code data and Q-axis code data representative of the position of a reception signal point to be used for detecting whether the position of the reception point belongs to which quadrant, to delay circuits 36 and 37 to delay them.

The baseband demodulation signals I' and Q' output from the QPSK mapping conversion circuit 35 are supplied to a Viterbi decoder 40 to Viterbi-decode them and output decoded data which is also supplied to a convolution encoder 41 to reencode them.

The delay time set to the delay circuits 32 to 34 and delay circuits 36 and 37 is a total sum of a time taken for the Viterbi decoder 40 to decode and a time taken for the convolution encoder 41 to reencode.

The tri-bit data (MSB, CSB, LSB) delayed by the delay circuits 32 to 34, the I-axis code data and Q-axis code data delayed by the delay circuits 36 and 37, and the convolution reencode outputs (TCD1, TCD0) are supplied to an MSB code judging/error detecting circuit 42 which obtains a most significant bit TCD2 and error flags of Trellis decoding. Demapping means to rearrange mapping of the relation between a reception signal and its phase.

As described above, for Trellis decoding in the conventional BS digital broadcast receiver, it is necessary to delay the demapped tri-bit data and the I-axis code data and Q-axis code data by a time equal to the total sum of the time for the Viterbi decoder to decide a path and the time for the convolution reencoding. Five delay circuits are therefore required.

It is an object of the present invention to provide a BS digital broadcast receiver capable of dispensing with an 8PSK demapper and reducing the number of delay circuits used for Trellis encoding.

DISCLOSURE OF THE INVENTION

A BS digital broadcast receiver for receiving a Trellis 8PSK modulation signal, as recited in claim 1 of this invention, comprises:

phase error data generating means for generating phase error data in accordance with a phase difference between 0 degree and a phase of a reception signal point position, in order to reproduce a carrier;

a Viterbi decoder for Viterbi-decoding a QPSK baseband signal based upon a reception signal point position of an absolute-phased baseband demodulation signal;

an encoder for convolution-encoding a Viterbi decode output;

delay means for delaying a predetermined number of upper bits of the phase error data corresponding to the phase difference between 0 degree and the phase of the reception signal point position, by a total sum of a time taken by said Viterbi decoder to Viterbi-decode and a time taken by said convolution encoder to convolution-encode;

a demapping conversion circuit for demapping outputs from said delay means; and an MSB code judging circuit for outputting a code determined from an output of said demapping conversion circuit and a convolution encode output, as an MSB of a Trellis 8PSK decode output.

According to the BS digital broadcast receiver as recited in claim 1 of this invention, the QPSK baseband signal based upon a reception signal point position of an absolute-phased baseband demodulation signal is Viterbi-decoded by the Viterbi-decoder. An output of the Viterbi-decoder is convolution-reencoded by a convolution encoder. A predetermined number of upper bits of phase error data corresponding to a phase difference between 0 degree and a phase of a phase error detection reception signal point position, is delayed by delay means for carrier reproduction, by a total sum of a time taken by the Viterbi decoder to Viterbi-decode and a time taken by the convolution encoder to convolution-encode. The delayed outputs from the delay means are demapped by the demapped value conversion circuit. A code determined from the demapped output and convolution encode output is output as an MSB of a Trellis 8PSK decode output from the MSB code judging/error detecting circuit.

Therefore, according to the BS digital broadcast receiver as recited in claim 1 of this invention, an 8PSK demapper conventionally required can be dispensed with and the number of delay circuits to be used for Trellis encoding is only the number of delay circuits predetermined for particular phase error data to thereby reduce the number of delay circuits.

In the BS digital broadcast receiver as recited in claim 1 of this invention, the predetermined number of upper bits may be four bits, the MSB code judging circuit may compare a reception signal point position on a Trellis 8PSK mapping having lower two bits same as a Viterbi decode output with an MSB judging demapped value on an MSB judging circle obtained by rotating the Trellis 8PSK mapping by 22.5 degrees, judge a reception signal point position having a shorter distance as a judged position, and if an MSB of the judged position is not same as an MSB of the MSB judging demapped value, invert the MSB of the MSB judging demapped value and outputs the inverted MSB as a judged MSB.

EMBODIMENTS OF THE INVENTION

Embodiments of a BS digital broadcast receiver of this invention will be described.

Figure 1:
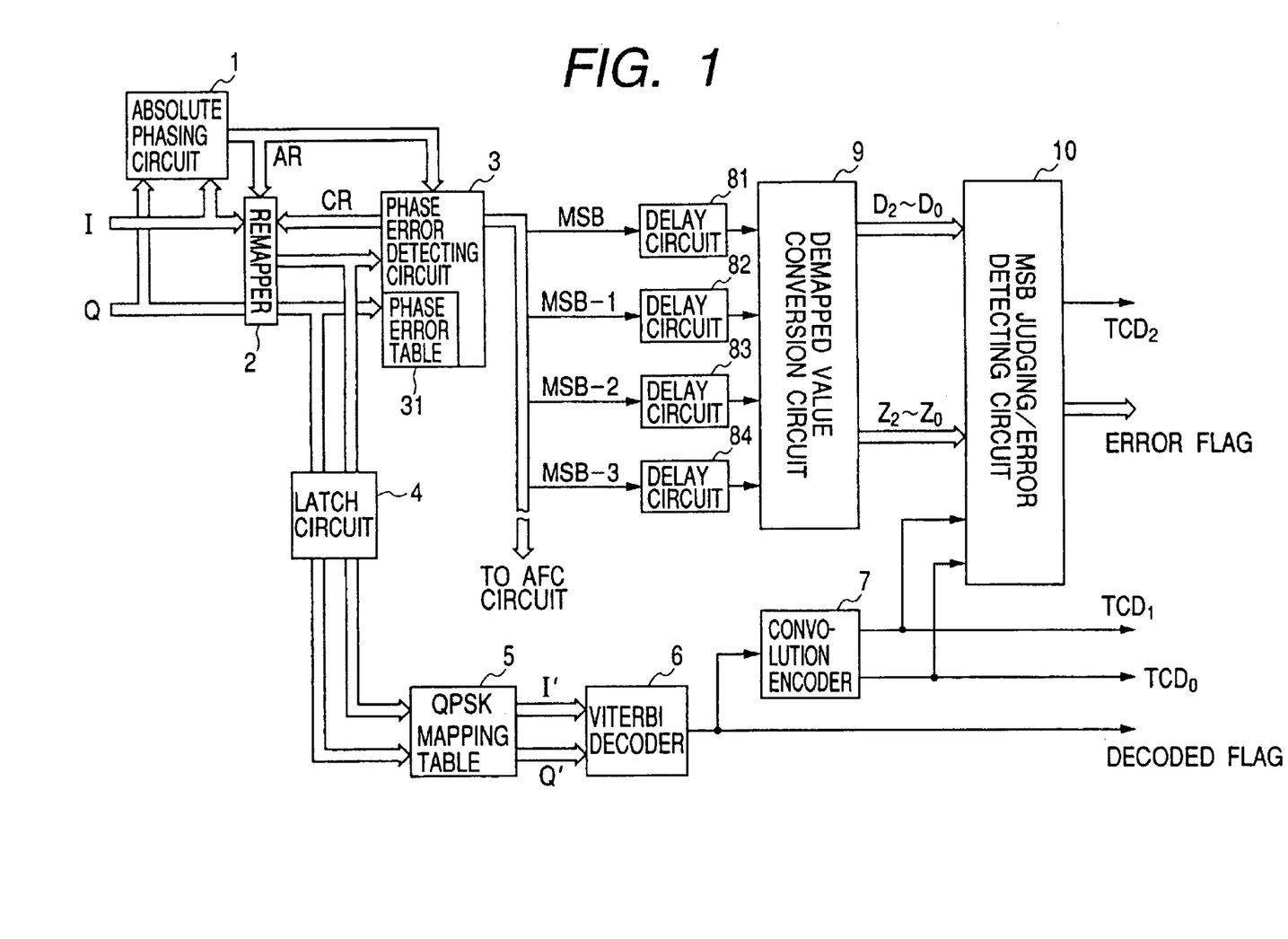
FIG. 1 is a block diagram partially showing the structure of a BS digital broadcast receiver according to an embodiment of the invention.

FIG. 1 is a block diagram partially showing the structure of a BS digital broadcast receiver according to an embodiment of the invention.

A reception signal converted into an intermediate frequency is demodulated by a demodulation circuit into 8-bit baseband demodulation signals I(8) and Q(8) ((8) is the number of quantization bits which is omitted hereinafter).

The demodulated baseband demodulation signals I and Q are supplied to an absolute-phasing circuit 1 and a remapper 2. The remapper 2 makes the reception signal point phase be coincident with the phase on the transmission side and also makes all reception points be set to a reference phase, e.g., 0 phase. The absolute-phasing circuit 1 obtains a current reception phase by comparing the reception point position of a frame sync signal in the baseband demodulation signals I and Q with an already know signal point position of a transmission side frame sync signal, and supplies a first phase rotation signal AR of three bits which signal is used for making the reception signal point position be coincident with the transmission signal point position. The remapper 2 rotates the reception signal phase in a reverse direction by an angle represented by the first phase rotation signal AR to thereby make the reception signal phase be coincident with the transmission signal phase.

The baseband demodulation signals I and Q absolute-phased by the remapper and having the coincident phase with the transmission signal phase are supplied to a phase error detecting circuit 3. The phase error detecting circuit 3 generates a second phase rotation signal CR of three bits representative of a difference between 0 degree and the reception point phase and supplies it to the remapper circuit 2. The remapper circuit 2 rotates the baseband demodulation signals I and Q in a reverse direction by an angle represented by the second phase rotation signal CR to make the reception point position be set to 0 degree.

A remapping process of the remapper 2 to make the reception signal point position be coincident with the position on the transmission side is executed during the first half period of one symbol period, and the remapping process to make the phase of the reception signal point position be set to 0 degree is executed during the last half period of one symbol period. The absolute-phasing circuit 1, remapper 2 and phase error detecting circuit 3 have been already proposed in Japanese Patent Application No. 10-033732 submitted by the present applicant.

The absolute-phased baseband signals output from the remapper 2 are supplied to a latch circuit 4 and latched during one symbol period synchronously with a symbol clock. Therefore, the latch circuit 4 continues to output the absolute-phased baseband demodulation signals I and Q during one symbol period.

Figure 2A:
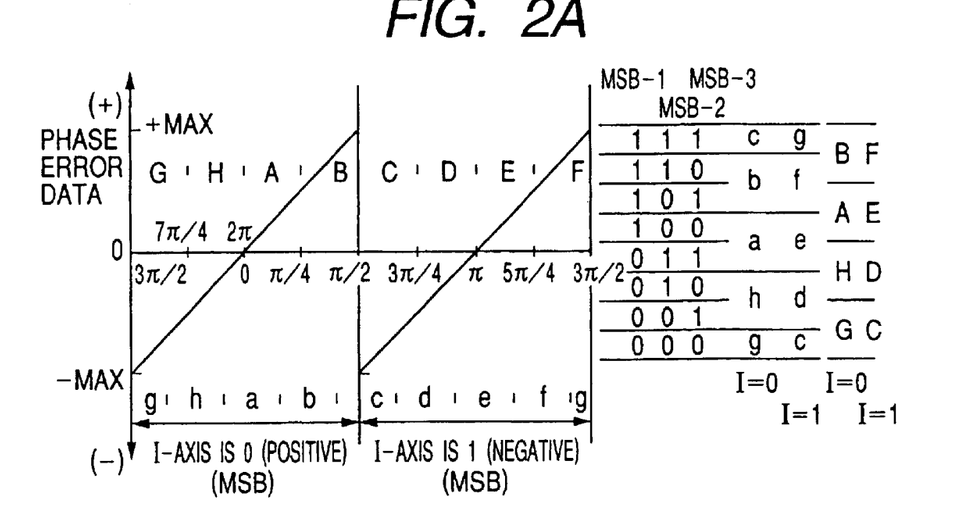
FIGS. 2(A) to 2(C) are schematic diagrams illustrating demapping phase error data and a phase error data used by the BS digital broadcast receiver of the embodiment.

The phase error detecting circuit 3 has a phase error table 31 schematically shown in FIG. 2(A). This phase error table 31 stores therein phase difference data between 0 degree and the reception signal phase of each of the baseband demodulation signals I and Q. By referring to this phase error table 31, the phase difference data between 0 degree and the reception signal phase of each of the baseband demodulation signals I and Q whose phase was set to 0 degree is obtained and supplied to an AFC circuit to reproduce the carrier.

The phase error detecting circuit 3 is required to have only one phase error table 31 which stores the phase error data corresponding to the phase difference between 0 degree and the reception signal phase of each of the baseband modulation signals I and Q demodulated from a received 8PSK modulation signal. The angle of 0 degree is only illustrative and an optional reference value may be used. In this case, the phase error table 31 stores the phase difference between the optional reference value and the reception signal phase.

The absolute-phased baseband signals I and Q output from the latch circuit 4 are supplied to a QPSK mapping table conversion circuit 5 and converted into QPSK baseband demodulation signals I' and Q' in accordance with the signal point arrangement of lower two bits of the tri-bit data demapped from the reception points. The QPSK mapping table conversion circuit 5 maps the absolute-phased baseband modulation signals I and Q into QPSK signals schematically shown in FIG. 3(B) in accordance with the lower two bits of the tri-bit data demapped from the reception points schematically shown in FIG. 3(A). In this manner, the QPSK baseband modulation signals I' and Q' based on the reception signal point positions can be obtained.

These converted QPSK baseband modulation signals I' and Q' are supplied to a Viterbi decoder 6 to be Viterbi-decoded. This decoded data is supplied to a convolution encoder 7 to be reencoded and output as encode outputs TCD1 (C1) and TCD0 (C0).

The upper four bits (MSB, MSB-1, MSB-2, MSB-3) of the phase error data of eight bits output from the phase error detecting circuit 3 by referring to the phase error table 31 are supplied to delay circuits 81, 82, 83 and 84, respectively, to be delayed by a total sum of the time taken for the Viterbi-decoder to decode and the time taken for the convolution encoder 15 to encode.

The outputs from the delay circuits 81, 82, 83 and 84 are supplied to a demapped value conversion circuit 9 which generates an MSB judging demapped value for deciding either 0 or 1 of MSB of the Viterbi decode output for the Trellis decoding process and an error flag demapped value for detecting an error. Instead of supplying the upper four bits of the phase error data to the delay circuits, they may be directly supplied to the demapped value conversion circuit and the output of the demapped value conversion circuit is supplied to delay circuits.

Prior to describing the demapped value conversion circuit 9, the upper four bits of the output of the phase error table 31 shown in FIG. 2(A) will be described. If the phase difference between 0 degree and the phase of the reception signal point of each of the baseband signals I and Q is in the range from $3\pi/2$ radian to 0 and to $\pi/2$ radian, the value (MSB) of the I-axis is 0 (positive) and MSB of the phase error data is 1. If the phase difference between 0 degree and the phase of the reception signal point of each of the baseband signals I and Q is in the range from $\pi/2$ radian to $\pi$ radian to $3\pi/2$ radian, the value (MSB) of the I-axis is 1 (negative) and MSB of the phase error data is 0. In FIG. 2(A), MSB-1, MSB-2 and MSB-3 of the phase error data are represented by binary data of three bits.

Figure 2B:
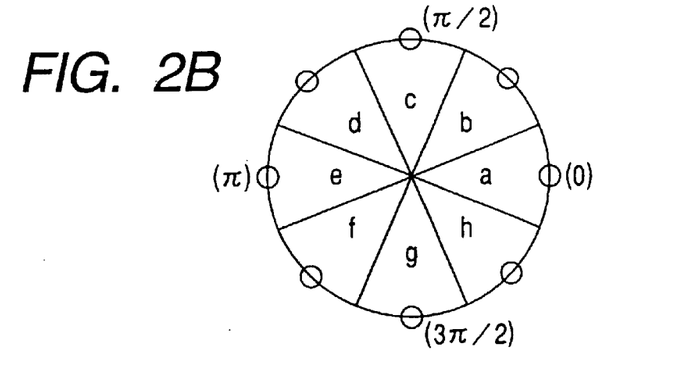
Figure 2C:
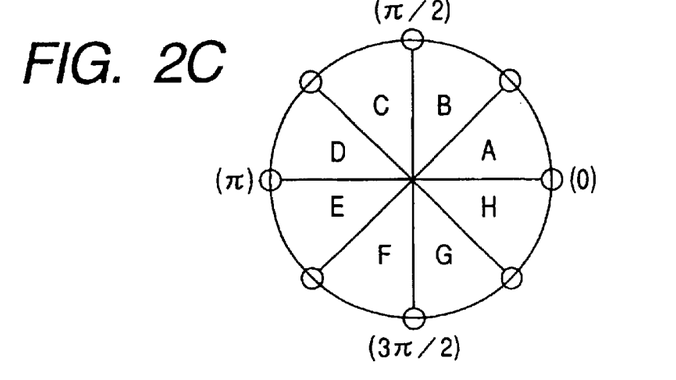
Figure 4:
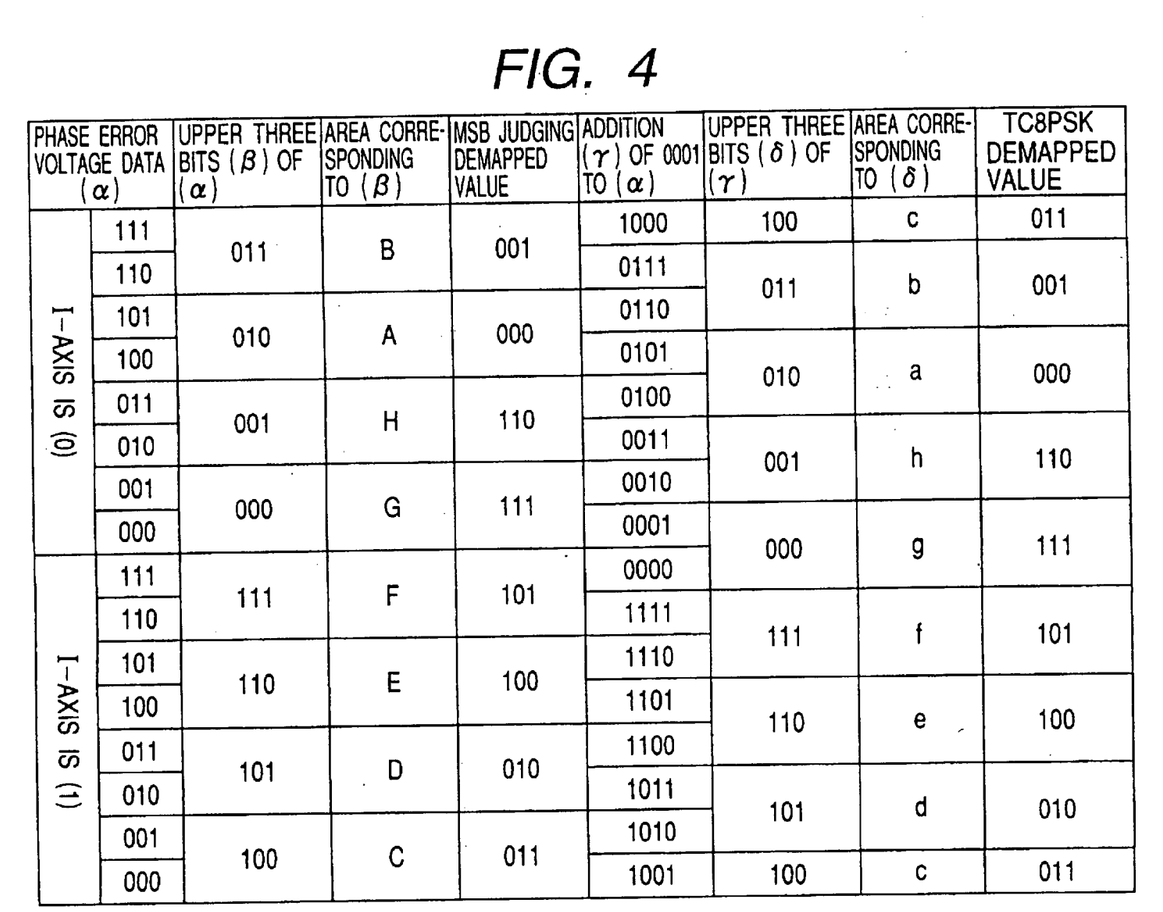
FIG. 4 is a diagram illustrating the relation between phase error data, MSB judging demapped values, and error flag demapped values used by the BS digital broadcast receiver of the embodiment.

The four bits ($\alpha$) of the phase error data are supplied to the demapped value conversion circuit 9. Areas corresponding to the upper three bits ($\beta$) of the phase error data ($\alpha$) are determined as A, B, . . . , H as shown in FIG. 2(C) from the upper three bits ($\beta$), as shown in FIG. 4. The upper three bits ($\beta$) are added to 110. If the lower two bits of the addition result are 11, these two bits are changed to 10, and if they are 10, they are changed to 11. The addition results are output as MSB judging demapped values (D2, D1, D0). With this process, the lower two bits of the MSB judging demapped values (D2, D1, D0) become gray codes.

The upper four bits ($\alpha$) of the phase error data are supplied to the demapped value conversion circuit 9, and the phase error data ($\alpha$) is added to 0001. The upper three bits ($\delta$) of the addition data ($\gamma$) are obtained. In accordance with the upper three bits, as shown in FIG. 4 the areas corresponding to the upper three bits ($\delta$) are determined as a, b, . . . , h as shown in FIG. 2(B). The upper three bits ($\delta$) are added to 110. If the lower two bits of the addition result are 11, these two bits are changed to 10, and if they are 10, they are changed to 11. The addition results are output as error flag demapped values (Trellis 8PSK demapped values (Z2, Z1, Z0)). With this process, the lower two bits of the error flag demapped values (Z2, Z1, Z0) become gray codes.

The MSB judging demapped values (D2, D1, D0) and error flag demapped values (Z2, Z1, Z0) output from the demapped value conversion circuit 9 and the reencoded outputs TCD1 and TCD0 from the convolution encoder 15, are supplied to an MSB judging/error detecting circuit 10.

In the phase error table shown in FIG. 2(A), corresponding areas a, b, . . . , h, A, B, . . . , H are shown for reference.

For Trellis encoding for 8PSK modulation, MSB of the tri-bit data is not convolution-encoded but it is output as it is. Therefore, it is necessary to decide MSB for decoding. For the Trellis 8PSK mapping shown in FIG. 3(A), an MSB judging circle shown in FIG. 3(C) an inner circle is considered which circle is obtained by rotating the circle shown in FIG. 3(a) by 22.5 degrees in a counter-clockwise direction.

Figure 3A:
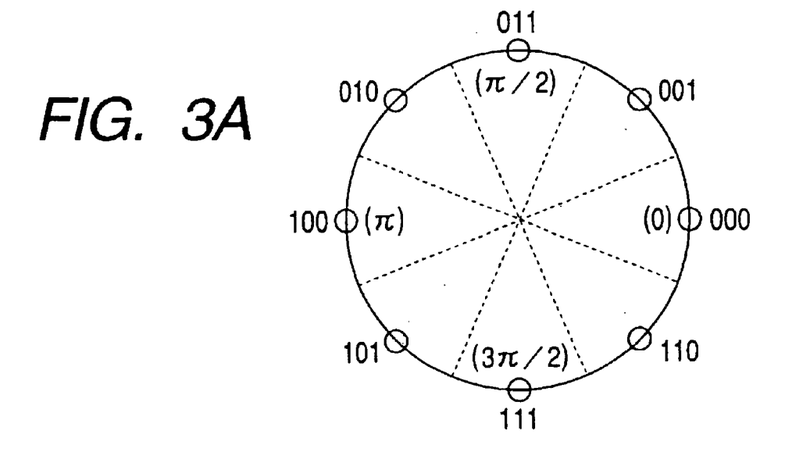
FIGS. 3(A) to 3(C) are schematic mapping diagrams illustrating the arrangement of Trellis 8PSK modulation signal points and MSB inversion used by the BS digital broadcast receiver of the embodiment.

Consider now, for example, a Viterbi decode result of 01. Positions 001 and 101 in the Trellis 8PSK mapping both have the lower two bits of 01 which are the same as the Viterbi decode result. Therefore, the positions 001 and 101 are used as the MSB candidates for the Trellis 8PSK mapping. If the MSB judging demapped value is 010, the MSB candidate 101 is nearer to the MSB judging demapped value 010 than the MSB candidate 001, as indicated by a one-dot chain line so that 101 is decided as MSB. With this decision, the MSB judging demapped value is 010, whereas the decided MSB value is 101. Since both MSBs have different codes, it is necessary to invert MSB of the MSB judging demapped value 010.

Similarly, if the MSB judging demapped value is 111 for the Viterbi decode result of 01, the MSB candidate 101 is nearer to the MSB judging demapped value 111 than the MSB candidate 001, as indicated by a two-dot chain line so that 101 is decided as MSB. With this decision, since the decided MSB value for MSB judging demapped value of 111 is 101, MSB of the MSB judging demapped value of 111 and MSB of the decide MSB value of 101 have the same code. It is not necessary to invert MSB of the MSB judging demapped value 111.

Figure 3B:
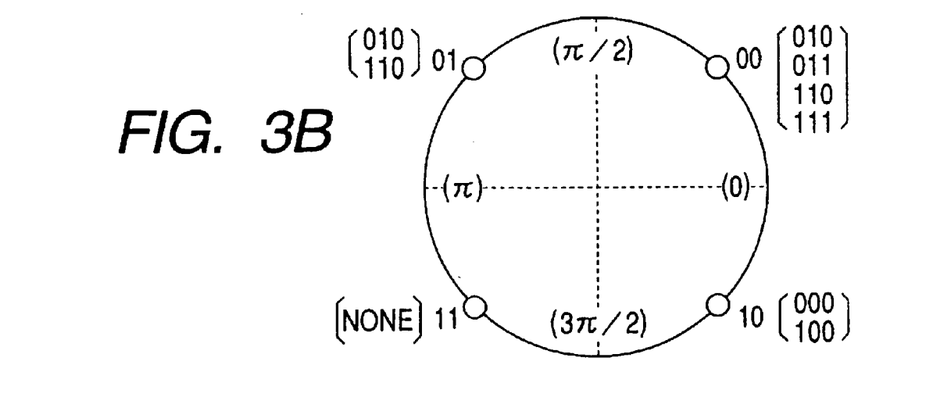
Figure 3C:
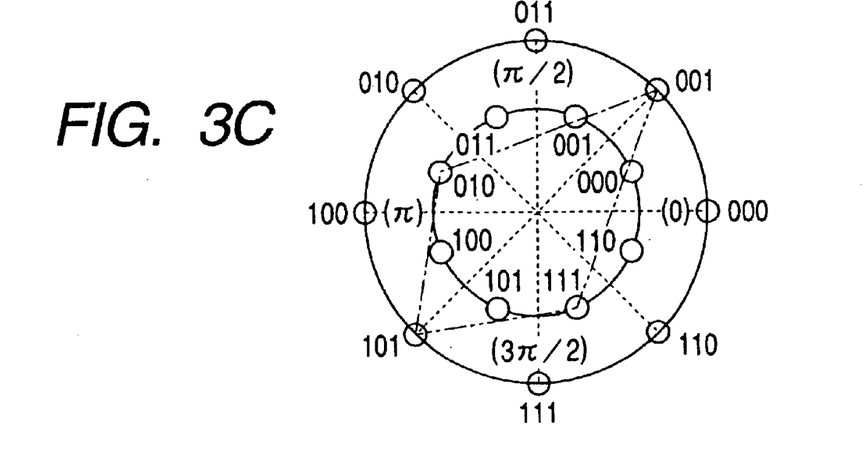
Figure 5:
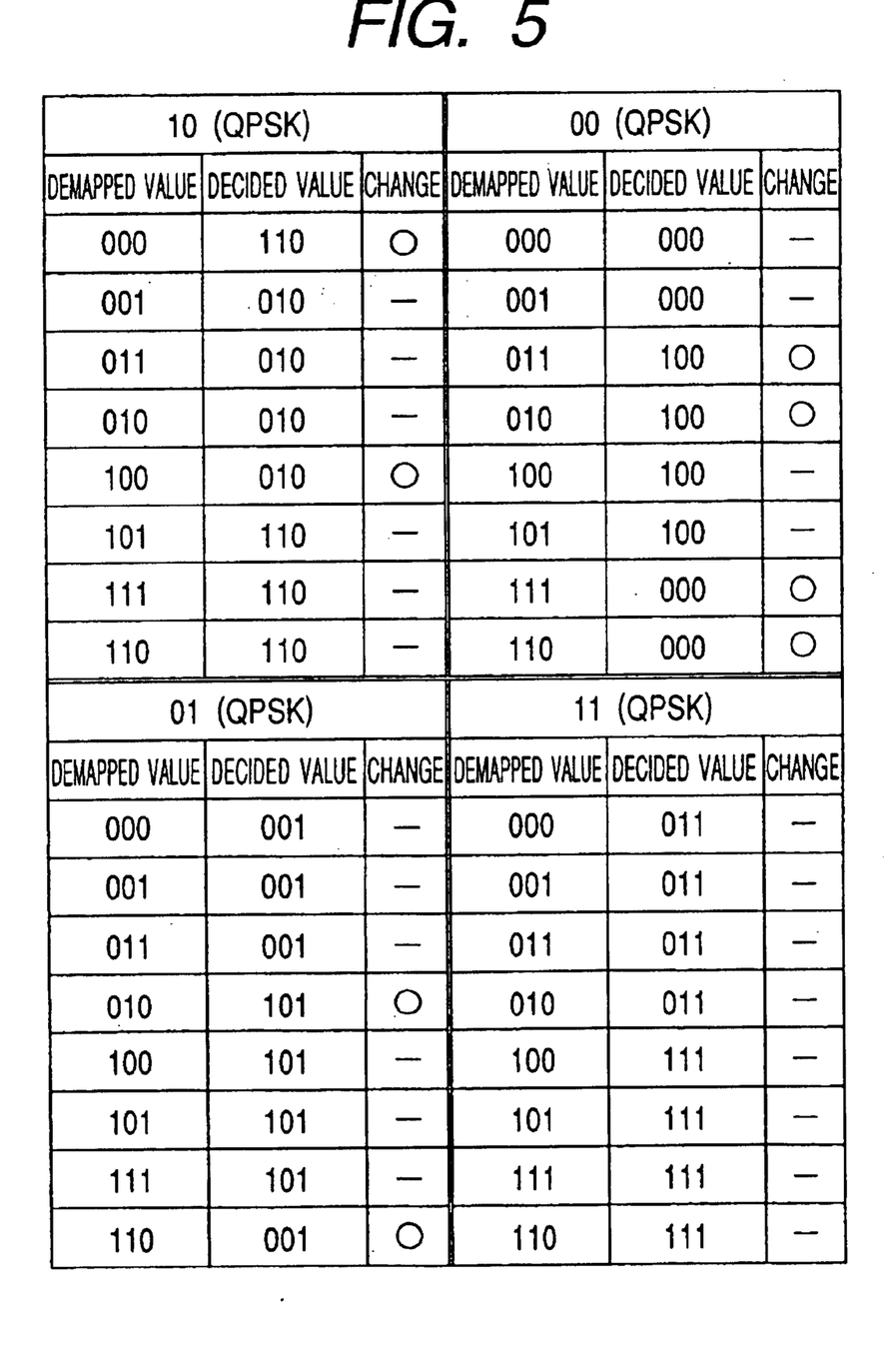
FIG. 5 is a diagram illustrating the relation between MSB judging demapped values and decided MSB values used by the BS digital broadcast receiver of the embodiment.

Whether the code of MSB is required to be inverted or not is determined as in the above manner, for each Viterbi decode result and each MSB judging demapped value. This result is shown in FIG. 5. In FIG. 5, a circle symbol in a change column indicates that MSB is required to be inverted. The demapped value for which MSB is required to be inverted is indicated in the square brackets [ ] in FIG. 3(B) schematically in correspondence with the Viterbi decode result. In FIG. 5, the Viterbi decode result is simply indicated as xx, the MSB judging demapped value is simply indicated as a demapped value, and the decided MSB value is simply indicated as a decided value.

Figure 6:
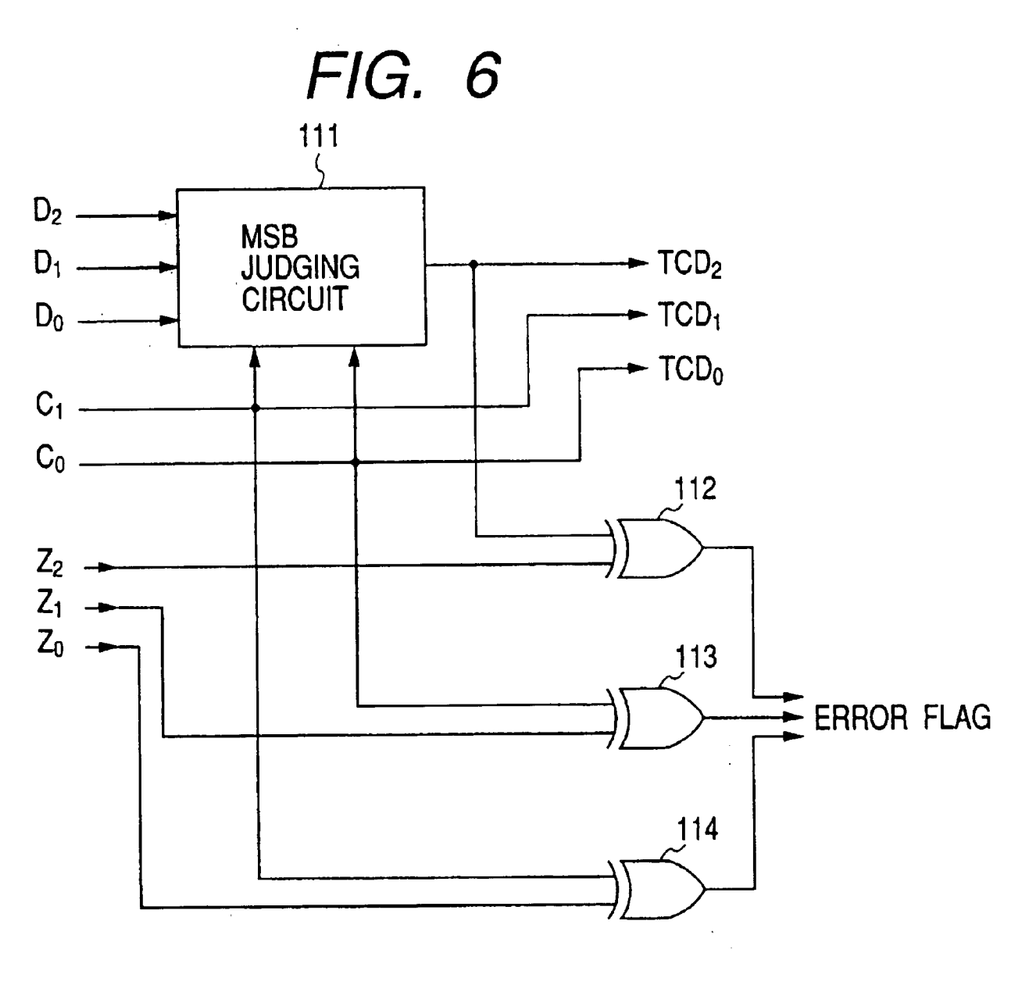
FIG. 6 is a block diagram showing the structure of an MSB code judging/error detecting circuit of the BS digital broadcast receiver of the embodiment.

As shown in FIG. 6, the MSB judging/error detecting circuit 10, to which the MSB judging demapped values (D2, D1, D0) and error flag demapped values (Z2, Z1, Z0) output from the demapped value conversion circuit 9 are supplied, is constituted of an MSB judging circuit 111, exclusive logical OR circuits 112, 113 and 114.

Figure 7:
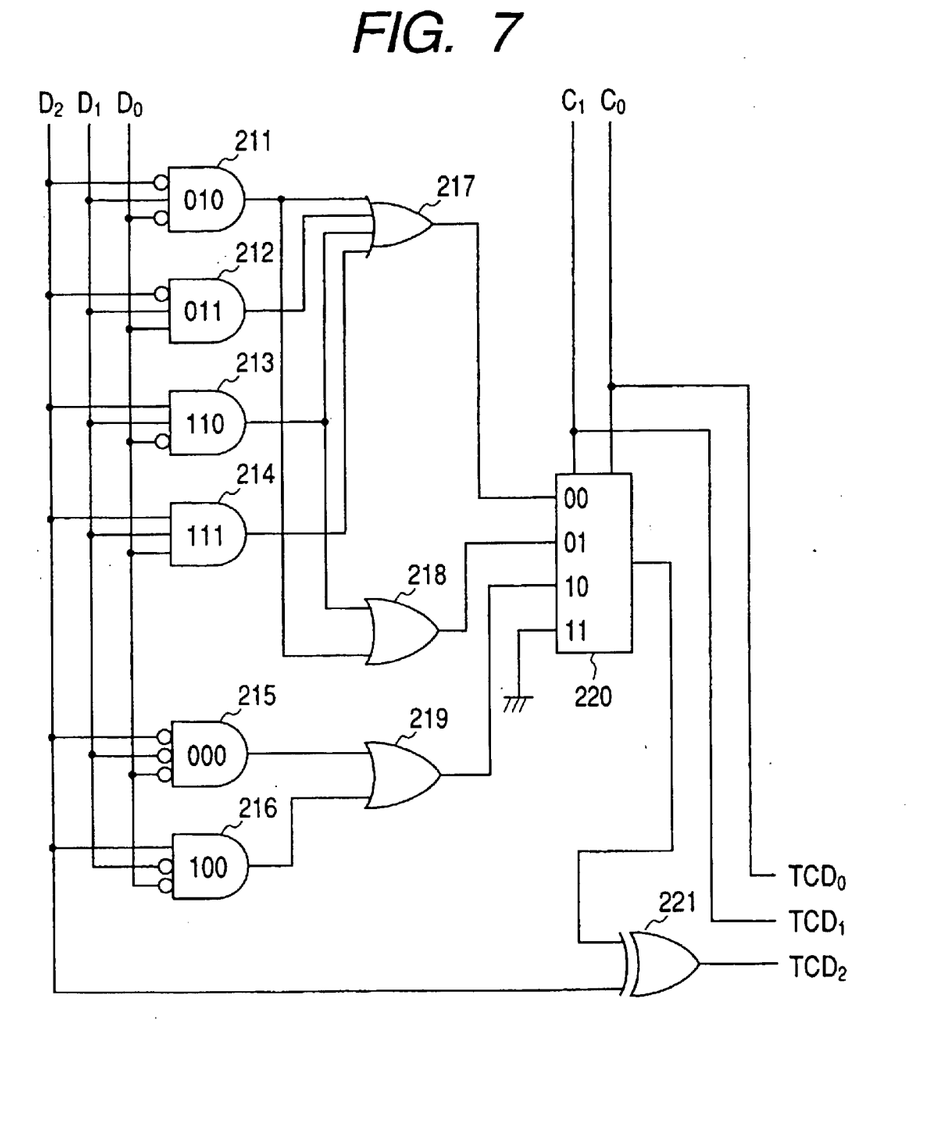
FIG. 7 a block diagram showing the structure of an MSB code judging circuit of a BS digital broadcast receiver according to another embodiment of the invention.

As shown in FIG. 7, the MSB judging circuit 111 has: AND gates 211 to 216 to which the MSB judging demapped values (D2, D1, D0) for judging MSB required to be inverted are supplied; OR gates 217 to 219 which output data in accordance with the Viterbi decode results; a selector 220 for selecting one of the outputs from the OR gates 217 to 219 in accordance with the Viterbi decode result; and an exclusive logical OR circuit 221 for receiving an output from the selector 220 and D2 of the MSB judging demapped values (D2, D1, D0) and outputting TCD2 (MSB). TCD2 (MSB) output from the exclusive logical OR circuit 221 and the decode output from the Viterbi decoder 6 constitute the Trellis-decoded Viterbi decode data. In FIG. 7, TCD1 and TCD0 are convolution-reencoded outputs (C1, C0) from the convolution encoder 7.

The AND gate 211 outputs a high level signal when the MSB judging demapped value takes 010, the AND gate 212 outputs a high level signal when the MSB judging demapped value takes 011, the AND gate 213 outputs a high level signal when the MSB judging demapped value takes 110, and the AND gate 214 outputs a high level signal when the MSB judging demapped value takes 111. The OR gate 217 outputs a high level signal when the AND gate 211, 212, 213, or 214 outputs the high level signal, this output being selected by the selector 220 when the convolution-reencoded outputs (C1, C0) are 00.

The OR gate 218 outputs a high level signal when the AND gate 211 or 213 outputs the high level signal, this output being selected by the selector 220 when the convolution reencoded outputs (C1, C0) are 01.

The AND gate 215 outputs a high level signal when the MSB judging demapped value takes 000, and the AND gate 216 outputs a high level signal when the MSB judging demapped value takes 100. The OR gate 219 outputs a high level signal when the AND gate 215 or 216 outputs the high level signal, this output being selected by the selector 220 when the convolution reencoded outputs (C1, C0) are 10.

The high level signal from the selector 220 is inverted in accordance with the MSB judging demapped value D2 of 0 or 1 and output as TCD2 of 1 or 0.

As apparent from the foregoing description, in judging MSB, the reception signal point position in the Trellis 8PSK mapping having the same lower two bits as the encode output of the Viterbi code is compared with the MSB judging demapped value on the MSB judging circle obtained by rotating the Trellis 8PSK mapping in the counter-clockwise direction by 22.5 degrees, and if MSB of the judged position is not the same as MSB of the MSB judging demapped value, MSB of the MSB judging demapped value is inverted and outputs as the judged MSB.

The MSB judging circuit 111 outputs an inverted MSB when the demapped value is required to be inverted as illustrated in FIG. 5. In this manner, the MSB judging circuit 111 performs Trellis decoding in cooperation with the Viterbi decoder 6 and convolution encoder 7.

The output TCD2 of the MSB judging circuit 111 and the error flag demapped value Z2 are supplied to the exclusive OR circuit 112, the convolution reencoded output C0 and error flag demapped value Z1 are supplied to the exclusive OR circuit 113, and the convolution reencoded output C1 and error flag demapped value Z0 are supplied to the exclusive OR circuit 114. Error flags are output from the exclusive OR circuits 112 to 114.

The exclusive OR circuits 112 to 114 can output the error flags because one input to each of the exclusive OR circuits 112 to 114 is equal to the input for the convolution encoding and if it is not coincident with each of the error flag demapped values Z2 to Z0, a set bit is output.

INDUSTRIAL APPLICABILITY

As described so far, according to the BS digital broadcast receiver of this invention, an 8PSK demapper conventionally required can be dispensed with, and the number of delay circuits to be used for Trellis encoding is only the number of delay circuits predetermined for particular phase error data to thereby reduce the number of delay circuits.

What is claimed is:

1. A BS digital broadcast receiver for receiving a Trellis 8PSK modulation signal, comprising:

phase error data generating means for generating phase error data in accordance with a phase difference between 0 degree and a phase of a reception signal point position of an absolute-phased baseband demodulation signal, in order to reproduce a carrier;

a Viterbi decoder for Viterbi-decoding a QPSK baseband signal based upon the reception signal point position of the absolute-phased baseband demodulation signal;

an encoder for convolution-encoding a Viterbi decode output;

delay means for delaying a predetermined number of upper bits of the phase error data corresponding to the phase difference between 0 degree and the phase of the reception signal point position of the absolute-phased baseband demodulation signal, by a total sum of a time taken by said Viterbi decoder to Viterbi-decode and a time taken by said convolution encoder to convolution-encode;

a demapping conversion circuit for demapping outputs from said delay means; and an MSB code judging circuit for outputting a code determined from an output of said demapping conversion circuit and a convolution encode output, as an MSB of a Trellis 8PSK decode output.

2. A BS digital broadcast receiver according to claim 1, wherein the predetermined number of upper bits is four bits.

3. A BS digital broadcast receiver according to claim 1, wherein said MSB code judging circuit compares a reception signal point position of the absolute-phased baseband demodulation signal on a Trellis 8PSK mapping having lower two bits same as a Viterbi decode output with an MSB judging demapped value on an MSB judging circle obtained by rotating the Trellis 8PSK mapping by 22.5 degrees, judges a reception signal point position of the absolute-phased baseband demodulation signal having a shorter distance as a judged position, and if an MSB of the judged position is not same as an MSB of the MSB judging demapped value, inverts the MSB of the MSB judging demapped value and outputs the inverted MSB as a judged MSB.

4. A BS digital broadcast receiver for receiving a Trellis 8PSK modulation signal, comprising:

phase error data generating means for generating phase error data in accordance with a phase difference between a predetermined reference phase and a phase of a reception signal point position of an absolute-phased baseband demodulation signal, in order to reproduce a carrier;

a Viterbi decoder for Viterbi-decoding a QPSK baseband signal based upon the reception signal point position of the absolute-phased baseband demodulation signal;

an encoder for convolution-encoding a Viterbi decode output;

a demapping conversion circuit for demapping a predetermined number of upper bits of the phase error data; and an MSB code judging circuit for outputting a code determined from an output of said demapping conversion circuit and a convolution encode output, as an MSB of a Trellis 8PSK decode output, wherein an output of said demapping conversion circuit and the convolution encode output are synchronously input to said MSB code judging circuit.

* * * * *